US006289849B1

(12) United States Patent
Macedo et al.

(10) Patent No.: US 6,289,849 B1
(45) Date of Patent: Sep. 18, 2001

(54) DEVICE TO REMOVABLY ATTACH A FLASHLIGHT TO A RETRACTABLE DOG LEASH

(75) Inventors: Antone Macedo, Manville, RI (US); Peter A. Russo, Bedford, MA (US)

(73) Assignee: The Real Boss, LLC, Hilo, HI (US)

( * ) Notice: Subject to any disclaimer, the term of this patent is extended or adjusted under 35 U.S.C. 154(b) by 0 days.

(21) Appl. No.: 09/393,556

(22) Filed: Sep. 10, 1999

(51) Int. Cl.[7] .............................. A01K 27/00; F21K 17/04
(52) U.S. Cl. ............................................. 119/796; 362/103
(58) Field of Search .................................. 119/796, 797, 119/795, 792, 856, 857, 858; 362/103, 105, 108, 109

(56) References Cited

U.S. PATENT DOCUMENTS

| 4,970,631 | 11/1990 | Marshall. | |
|---|---|---|---|
| 4,984,724 | * 1/1991 | Johnston | 224/257 |
| 5,053,932 | * 10/1991 | Case | 362/105 |
| 5,154,506 | 10/1992 | Leard. | |
| 5,233,942 | * 8/1993 | Cooper et al. | 119/792 |
| 5,345,368 | 9/1994 | Huff. | |
| 5,429,075 | 7/1995 | Passarella et al.. | |
| 5,438,494 | * 8/1995 | Harlan | 362/106 |
| 5,558,044 | 9/1996 | Nasser, Jr. et al.. | |
| 5,752,633 | 5/1998 | Antaki. | |
| 5,762,029 | 6/1998 | DuBois et al.. | |
| 5,887,550 | 3/1999 | Levine et al.. | |
| 6,062,700 | * 5/2000 | Price | 362/103 |

FOREIGN PATENT DOCUMENTS 9112529   2/1993   (DE).

* cited by examiner

Primary Examiner—Charles T. Jordan
Assistant Examiner—Yvonne Abbott
(74) Attorney, Agent, or Firm—Samuels, Gauthier & Stevens

(57) ABSTRACT

A device for detachably connecting a flashlight to a retractable leash. The device includes a flexible elongated base member having a top and a bottom side. An elastic member attached to the top side of the elongate member creates an aperture there between for removably inserting a flashlight. Two straps are attached to the bottom of the based member for detachably connecting the elongated base member to a handle of the retractable leash.

8 Claims, 2 Drawing Sheets

DEVICE TO REMOVABLY ATTACH A FLASHLIGHT TO A RETRACTABLE DOG LEASH

BACKGROUND OF THE INVENTION

This invention is directed to a device to removably attach a flashlight onto a retractable dog leash.

Dog owners take their dogs out for walks at all times of the day or night. When out at night it is a good idea to use a flashlight not only to see where one is going but to let automobile drivers know where there is an impediment on or near the road. Many dog owners like to use retractable dog leashes to vary the distance the dog can roam depending on their surroundings. A retractable dog leash in one hand and a flashlight in the other leaves no free hand, hence the need for a combination of the two.

Combined dog leashes and flashlights, both retractable and non-retractable dog leashes, are known in the prior art. A few examples can be seen in U.S. Pat. No. 5,558,044 issued to Nasser, Jr. et al.; U.S. Pat. No. 5,762,029 issued to DuBois et al.; and U.S. Pat. No. 5,887,550 issued to Levine et al. The combination flashlights and retractable dog leashes are larger and weigh more than a retractable leash without a flashlight. A flashlight is unnecessary during the daylight and thus there is no need to carry a larger, more cumbersome device than is essential.

U.S. Pat. No. 5,429,075 is directed to a combination of a non-retractable pet leash and flashlight. The device includes both a tubular structure having a switch port in the side thereof. The tubular structure is attached to the handle of a dog leash with complementary strips of a hook and loop type fasteners, known as Velcro®. However, the length of the dog leash can not be adjusted, and the flashlight and attached device appear to be awkward to use as they are in the way of the person holding the leash. Also, the handle of the dog leash must be pliable as the section of the handle which includes the Velcro® must be straightened, and stay straightened, so to that the tubular member can be attached to it.

It is an object of the present invention to provide a device which may be removably attached to a retractable dog leash.

Another objective of the present invention is to provide a device which maintains the flashlight in one location on the handle of the dog leash without sliding around the handle.

Still another objective of the present invention is to provide a device which is easy to used and inexpensive to manufacture.

SUMMARY OF THE INVENTION

A device for removably attaching a flashlight to a retractable dog leash or any other device which one wishes to use in conjunction with a flashlight. The device includes a flexible, elongated webbed base. A segment of elastic is attached to the top side of the base to create an aperture between the base and the elastic in which a flashlight may be inserted and later removed. Complementary Velcro® straps are attached to the base such that the segments may be wrapped around the handle of a retractable dog leash, coupled to each other to maintain the flashlight in place and uncoupled at a later time to remove the device from the leash.

BRIEF DESCRIPTION OF THE DRAWINGS

Other objects, features and advantages of the present invention will become more apparent in light of the following detailed description in connection with the accompanying drawings, wherein.

DETAILED DESCRIPTION OF THE INVENTION

Figure 1:
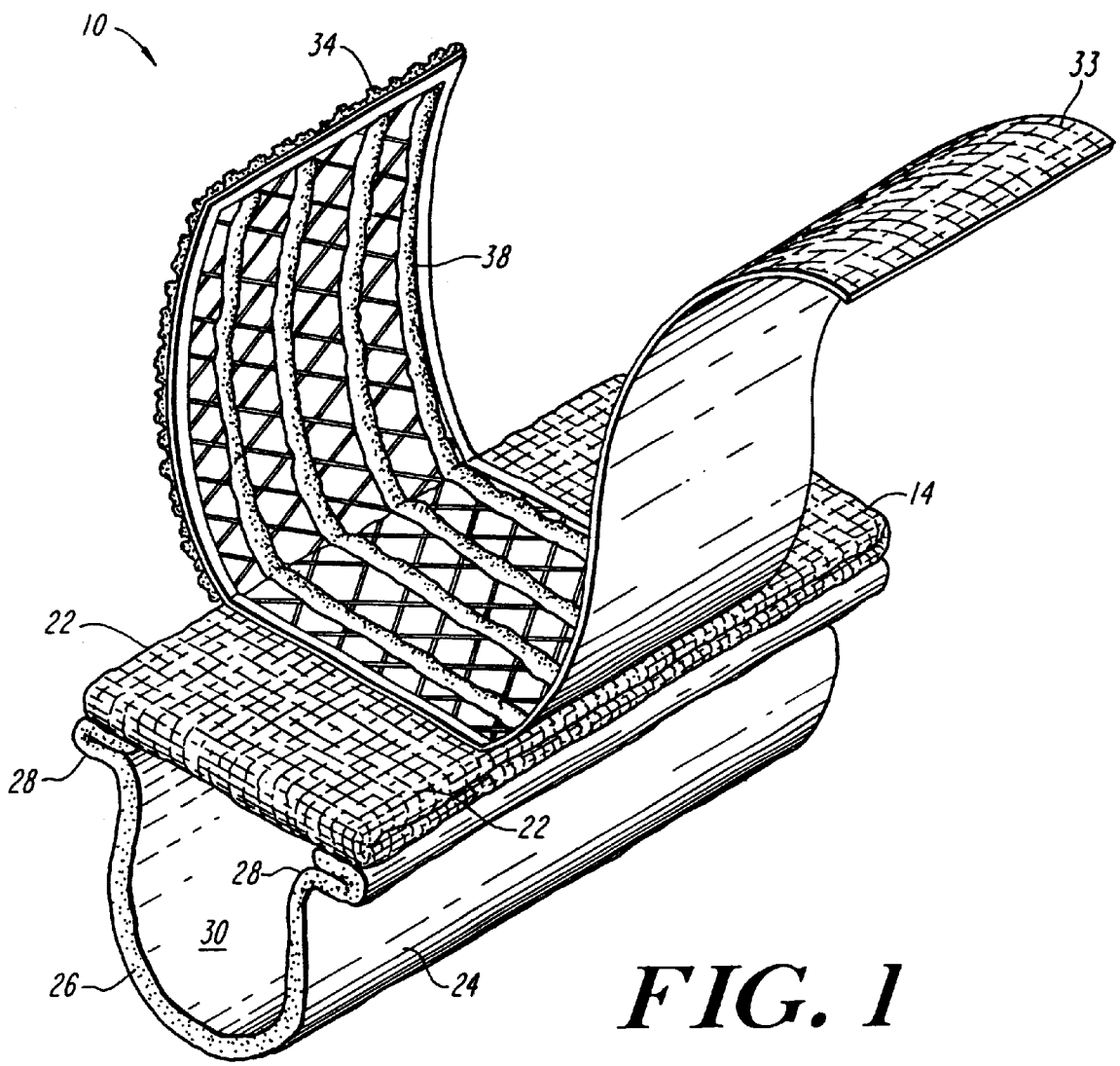
FIG. 1 is a perspective view of a device to removably couple a flashlight onto a retractable dog leash in accordance with the present invention.
Figure 2:
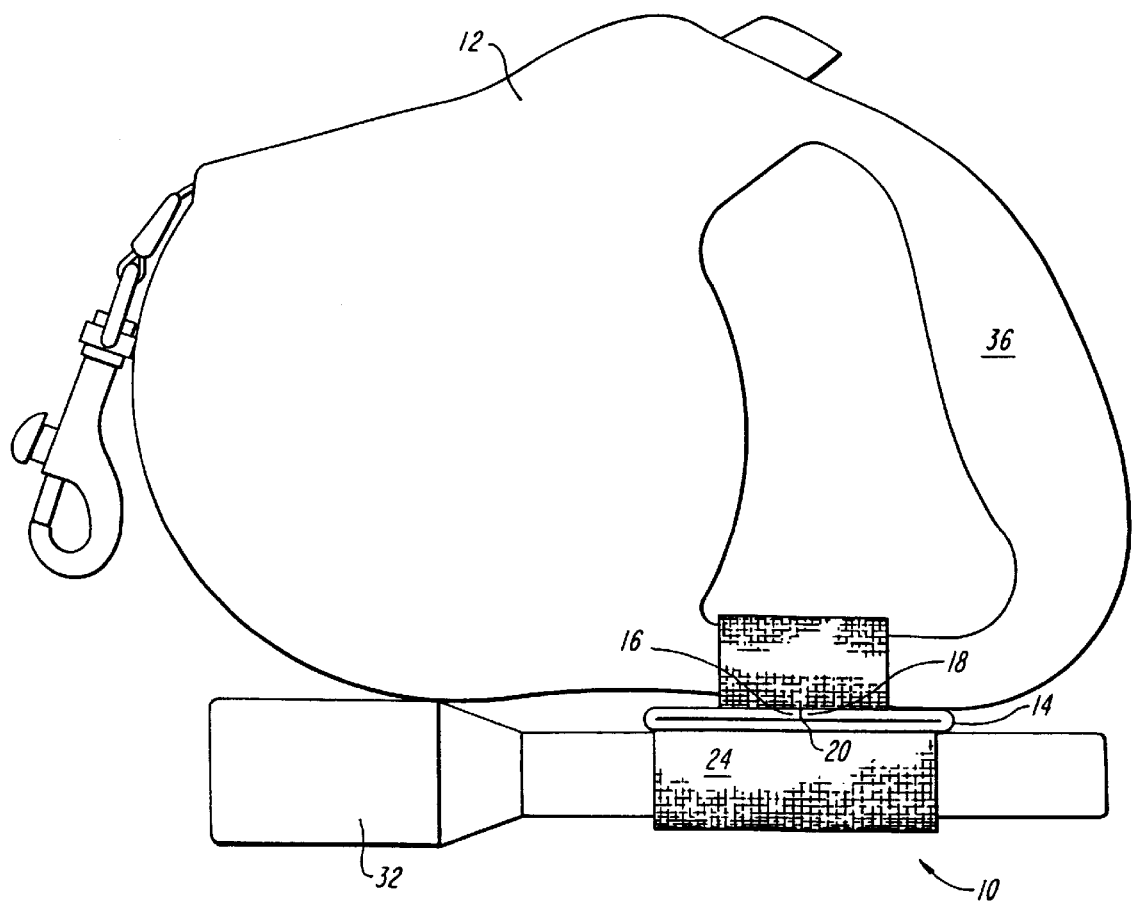
FIG. 2 is a perspective view of the device attached to retractable dog leash and having a flashlight positioned within the device.

As illustrated in the drawings, a device to removably attach a flashlight to a retractable dog leash 12 is shown at 10. The device 10 includes an elongated base material 14. The base 14 should be strong but flexible. Each end 16, 18 of the elongated base or strip 14 is folded in on itself to the center 20 of the strip 14 and sewn in place, as close to the edges 22 as possible. A heavy duty elastic segment 24 is folded in a substantially U-shape 26. For added strength, the edges 28 of the U-shape 26 are folded over onto themselves before being stitched to the prepared base 14. The combination of the U-shaped elastic member 24 and the elongated base material 14 create an aperture 30. The aperture 30 as illustrated in the figures is dimensioned to receive and accommodate a shank portion of a standard high intensity, smaller diameter flashlight 32, such as an AA or an AAA-cell flashlight. However, if desired, a larger sized aperture can be created by using alternatively sized materials.

Two straps 33, 34 attached to the bottom of the base webbing 14 wrap around the handle 36 of the dog leash 12 to hold the device in place. The mating faces of the straps include hook 33 and loop 34 fastener material, the leading brand known as Velcro®. The straps 33, 34 may be sewn onto the back of the webbing. The two straps 33, 34 may overlap so that the sewing step can completed in one step, rather than sewing each strap individually and to ensure the strength of the attachment of the straps to the base. To remove the device 10 from the dog leash 12, one strap 33 is pull away from its mating surface 38 and the device is then uncoupled from the dog leash handle 36.

The base material 14 may be selected from polymeric webbing, nylon, polypropylene, cotton or other similar type of material. Webbing has a tendency to rotate around plastic materials such as those used to in dog leashes. To prevent the device from rotating around the handle, a non-skid material 38 is placed on the back of the loop portion of the Velcro® strap 34. The non-skid material 38 may include a non-skid fabric sewn thereon, a non-skid coating of PVC or neoprene or any other material having non-skid characteristics.

The foregoing description has been limited to a specific embodiment of the invention. It will be apparent, however, that variations and modifications can be made to the invention, with the attainment of some or all of the advantages. For example, the device may be attached to other equipment or paraphernalia to hold the flashlight or other similar shaped item in place. Additionally the materials may differ or the sizes varied based on ones needs. Therefore, it is the object of the claims to cover all such variations and modifications as come within the true spirit and scope of the invention What is now claimed is:

1. A device for detachably connecting a flashlight to a handle of a retractable dog leash, said device comprising:

a flexible elongated base member having a top and bottom side;

an elastic member having approximately the same width as the elongated base, permanently attached to the top side of said elongated base member to create an aperture between said base member and said elastic member;

means for detachably connecting said base member to the handle of the retractable dog leash such that a flashlight may be removably inserted into the aperture and maintained therein.

2. The device of claim 1 wherein said elastic member is sewn to said elongated base member.

3. The device of claim 1 wherein said means for detachably connecting said base member to the handle include straps, each strap having complementary hook-and-loop fastener material on one side thereof.

4. The device of claim 3 wherein the straps are sewn to said elongated base member.

5. The device of claim 4 wherein a nonskid material is attached to the underside of the strap having the loop fastener material.

6. The device of claim 1 wherein said elongated base member is webbing.

7. The device of claim 1 wherein said elastic member has two ends, each end being separately attached to the elongated base member.

8. The device of claim 1 wherein the length of said elongated base member is greater than the width of the means for detachably connecting the base member to the handle.

* * * * *